(12) United States Patent
Cao

(10) Patent No.: US 7,784,300 B2
(45) Date of Patent: Aug. 31, 2010

(54) REFRIGERATOR

(76) Inventor: Yiding Cao, 16302 SW. 68 Ter., Miami, FL (US) 33193

(*) Notice: Subject to any disclaimer, the term of this patent is extended or adjusted under 35 U.S.C. 154(b) by 432 days.

(21) Appl. No.: 11/888,982

(22) Filed: Aug. 4, 2007

(65) Prior Publication Data
US 2008/0148764 A1 Jun. 26, 2008

Related U.S. Application Data

(60) Provisional application No. 60/876,750, filed on Dec. 22, 2006.

(51) Int. Cl.
*F25D 9/00* (2006.01)
*F25B 9/00* (2006.01)
(52) U.S. Cl. .............................. 62/403; 62/6
(58) Field of Classification Search ............... 62/3.6, 62/6, 86, 113, 119, 238.1, 324.1, 401, 403, 62/467; 60/522; 123/41.19, 41.21, 41.2, 123/41.22, 41.34, 41.52, 41.69, 41.7, 41.76, 123/41.82 R, 41.85, 46 A, 46 AB, 50 A
See application file for complete search history.

(56) References Cited

U.S. PATENT DOCUMENTS

| | | | | |
|---|---|---|---|---|
| 3,879,945 A * | 4/1975 | Summers | ...................... | 60/522 |
| 3,937,030 A * | 2/1976 | Jaspers | .......................... | 62/86 |
| 4,242,878 A * | 1/1981 | Brinkerhoff | .................. | 62/119 |
| 4,622,813 A * | 11/1986 | Mitchell | ....................... | 60/522 |
| 2006/0213207 A1* | 9/2006 | Redlich | ........................... | 62/6 |

* cited by examiner

*Primary Examiner*—Frantz F. Jules
*Assistant Examiner*—Emmanuel Duke

(57) ABSTRACT

This invention provides a refrigerator using a gaseous working fluid such as air and based upon the well-developed structure of reciprocating compressors or rotating engines. The invention combines the compression functionality of a compressor and the expansion functionality of a turbine in an air cycle machine into a single refrigeration unit having a simple mechanical structure, and provides a significantly increased heat removal time period before the expansion stroke to reduce the temperature of the working fluid under a substantially constant volume without increasing the number of strokes per discharge in a cycle. Moreover, the need of using a man-made chemical as the working fluid is eliminated.

12 Claims, 14 Drawing Sheets

REFRIGERATOR

CROSS REFERENCES TO RELATED APPLICATIONS

This application is a continuation of provisional application 60/876,750 filed Dec. 22, 2006.

FIELD OF INVENTION

This invention relates to refrigerators, in particular related to refrigerators using a gas such as air as the working fluid.

BACKGROUND

A refrigerator is a system that lowers the temperature of a space or substance and then maintains that lower temperature. Currently, the predominant type of refrigeration system is the vapor-compression refrigeration system. Although other types of refrigeration systems such as absorption and jet ejector refrigeration systems have been developed, due to a lower coefficient of performance (COP), their uses are limited to certain applications where thermal energy is abundant. However, it is well known that many refrigerants currently used in vapor-compression refrigeration systems may have a negative environmental impact related to ozone layer depletion and global warming.

A refrigeration system using a gas as the working fluid without the change of phase is called the gas refrigeration system and operates on a gas refrigeration cycle. Regardless of a closed-loop configuration or an open-loop configuration, a gas refrigeration cycle consists of three essential processes. The first process is the compression process in which the intake working fluid is compressed to a higher temperature normally above the ambient temperature. The second process is called heat removal process in which an amount of heat is transferred from the working fluid normally to the ambient because of its above-ambient temperature after the compression to reduce its temperature. The third process is the expansion process in which the work fluid returns an amount of work to the system during the expansion and at the same time further lowers its temperature normally to a temperature below the ambient temperature as the cooled working fluid output. For a closed-loop configuration, the cooled working fluid is directed to a heat exchanger to receive an amount of heat from a space or an object being cooled. After the heat absorption, the working fluid returns to the inlet of a compressor as the intake working fluid. For an open-loop configuration, the cooled working fluid may be directly discharged into the space or object being cooled, and the intake working fluid of the compressor may be the air from the space being cooled or directly from the ambient.

More specifically, a refrigeration system using air as the working fluid may be called an air cycle machine (ACM), and operates on a Brayton refrigeration cycle that is the reverse of a Brayton power cycle. As a typical application, an ACM may be used as an environmental control system in pressurized turbine-powered aircraft. Because of the gaseous working fluid, no condensation or evaporation is involved, and the cooled air output from the process is used directly for cabin ventilation. The usual compression and expansion in a vapor-compression cycle may be accomplished in the ACM by a centrifugal compressor and an expansion turbine. In a typical configuration, system bleed air, which may be in excess of 150° C., is directed into a first heat exchanger before going through the compressor. Once the hot air is cooled, it is then compressed and sent to a second heat exchanger. The air is again cooled in the second heat exchanger and travels through the turbine which expands the air and reduces its temperature to a sufficiently low level. The work extracted by the turbine is transmitted by a shaft to the compressor to provide part of the work needed to drive the compressor.

Although the gas refrigeration system mentioned above has found some applications in niche markets, large-scale commercialization has not happened so far due to its low coefficient of performance, bulky size, and high costs. The linkage between the turbine and the compressor to transmit expansion work from the turbine to the compressor may also represent a challenge.

SUMMARY OF THE INVENTION

It is therefore an objective of this invention to provide a refrigerator using a gas, such as air, as the working fluid based on well-developed technologies, in particular the basic structure of a reciprocating compressor. The invention combines the compression functionality of a compressor and the expansion functionality of a turbine in an air cycle machine into a single refrigerator unit having a simple mechanical structure, and provides a significantly increased heat removal time period before the expansion stroke to reduce the temperature of the working fluid under a substantially constant volume without increasing the number of strokes per discharge in a cycle. Said refrigerator system comprises at least a piston and cylinder assembly including a piston reciprocatingly mounted within the cylinder space, and at least two cooling chambers associated with each cylinder. Each said cooling chamber has therewithin a heat exchanger unit that facilitates heat transfer from the working fluid to a heat sink or cooling fluid within said chamber, a port leading to said cylinder space, and a cooling-chamber valve, said valve opening or closing said port to establish or block communication between said chamber and cylinder space. Said refrigerator is adapted to operate on a cycle having 4n essential strokes for a refrigerator utilizing intake and discharge strokes for respective intake and discharge purposes, or 2n essential strokes for a refrigerator utilizing a scavenging process for discharge and intake purposes, where n is the number of cooling chambers associated with each cylinder. For a refrigerator having intake and discharge strokes, each said cooling chamber has an associated compression stroke, an expansion stroke, and between said compression and expansion strokes a time period of 4(n-1) strokes available for heat transfer from the working fluid enclosed within the cooling chamber to the heat sink. For a refrigerator utilizing a scavenging process for discharge and intake, each said cooling chamber has an associated compression stroke, an expansion stroke, and between said compression and expansion strokes a time period of 2(n-1) strokes available for heat transfer from the working fluid enclosed within the cooling chamber to the heat sink. In both cases, during the time period of heat transfer between the enclosed working fluid and heat sink, said piston would provide strokes for the working fluid associated with another cooling chamber. As a result, the refrigerator thus constructed may fulfill many basic operational requirements of an Otto refrigeration cycle that is the reverse of an Otto power cycle. The refrigerator may be relatively compact and inexpensive with a sufficiently large cooling capacity and a theoretical coefficient of performance (COP) comparable to that of a vapor-compression refrigerator. Moreover, the need of using a man-made chemical compound as the working fluid is eliminated.

Another objective of this invention is to provide a refrigerator based on a rotary engine in accordance with the principles described in the first objective.

Yet another objective is to provide a compact and convenient cooling means as a heat exchanger unit for said cooling chamber, said cooling means may be a heat pipe heat exchanger system.

A further objective of this invention is to provide a sufficiently strong motion of the gaseous working fluid within a cooling chamber relative to heat exchanger surfaces to achieve a sufficiently high heat transfer rate. Said objective may be accomplished through shaping the passage between the cylinder space and the cooling chamber or the disposition of a turning wheel.

DETAILED DESCRIPTION

Figure 1:
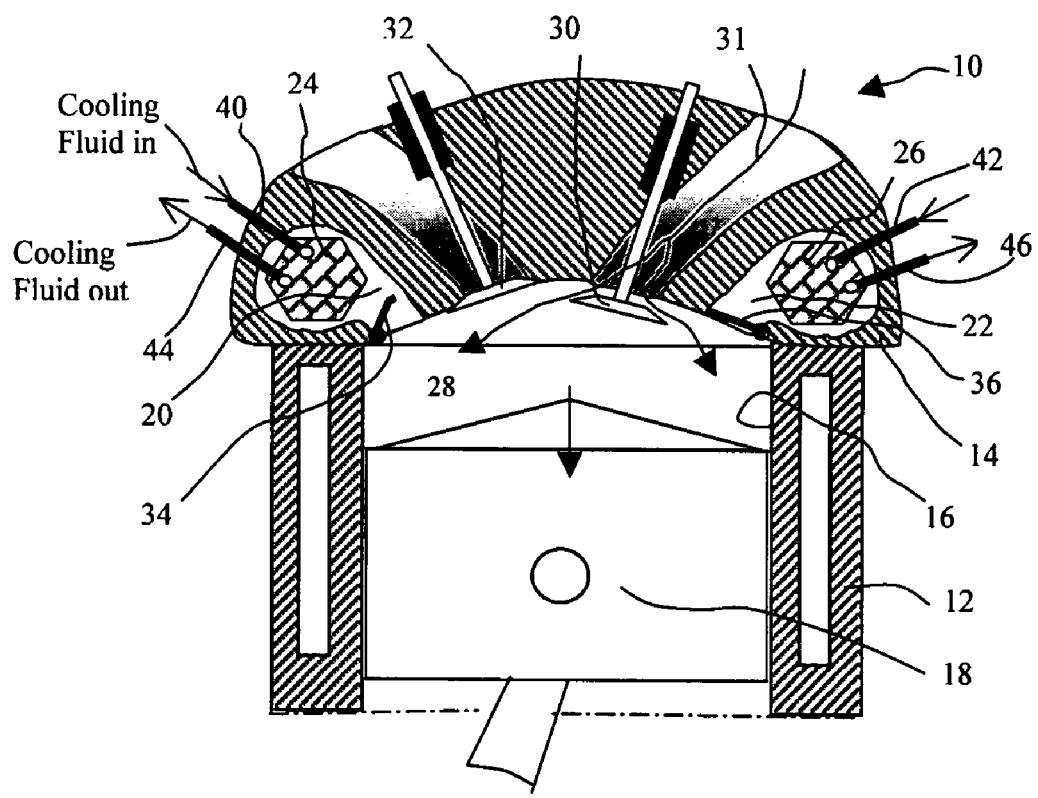
FIG. 1 is a schematic vertical sectional view of a refrigerator unit in accordance with the present invention, illustrating the arrangement of two cooling chambers as well as the positions of valves and piston during an intake stroke associated with the first cooling chamber.
Figure 2:
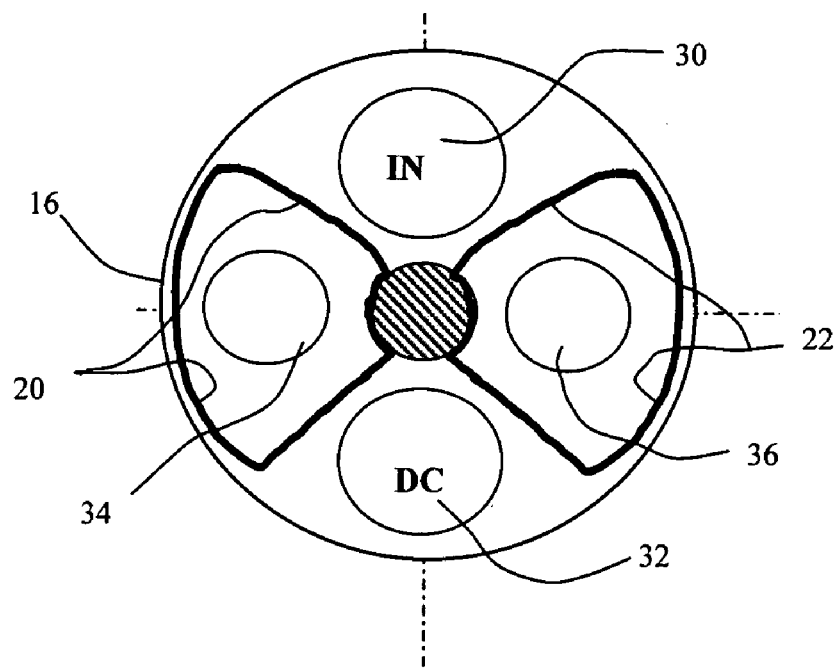
FIG. 2 is a schematic top sectional view of a refrigerator unit in accordance with the present invention, illustrating the arrangements of the cooling chambers and valves.

FIG. 1 illustrates a refrigerator 10 in accordance with the present invention, which includes a cylinder block 12 and a cylinder head 14. The cylinder block 12 contains at least a cylinder 16 and a piston 18 that is slidably disposed within the cylinder 16. Associated with each cylinder 16, the cylinder head 14 defines a first cooling chamber 20 and a second cooling chamber 22. Associated with said cooling chambers, a first heat exchanger unit 24 and a second heat exchanger unit 26 are disposed, respectively, within the cooling chambers 20 and 22. When the piston 18 reaches the top dead center (TC), cylinder space 28, as defined by the bottom face of the cylinder head 14, the top face of the piston 18, and the sidewall of the cylinder 16, may be minimized. The cylinder head is provided with an intake port and a discharge port, and the intake port has an intake valve 30, and the discharge port has a discharge valve 32. Additionally, the first cooling chamber 20 is provided with an opening port to the cylinder space. The opening port may be opened or closed by a cooling-chamber valve 34 that may establish or block communication between the first cooling chamber and the cylinder space. Similarly, the second cooling chamber 22 is provided with a cooling-chamber valve 36 that may establish or block communication between the second cooling chamber and the cylinder space. The cooling-chamber valve as well as the intake and discharge valves as illustrated herein is schematic in nature; they may be, but not limited to, puppet valves, slide valves, rotary valves, butterfly valves, switch valves, gate valves, or ball valves. A schematic top sectional view of a refrigerator illustrating a possible arrangement of the cooling chambers and valves is shown in FIG. 2. It should be emphasized that the arrangement as shown in FIG. 2 is just one of many possible options; other arrangements such as those maximizing intake and discharge areas by employing multiple intake valves and multiple discharge valves are possible. Similarly, the configuration having more than one chamber valve per chamber is also a possibility. Also, although the refrigerator as shown in the figure is in a vertical position, it may be posed in other positions including a substantially horizontal position, for different applications including automotive applications.

One skilled in the art may recognize that the structure as shown in FIG. 1 is similar to that of a well-known reciprocating compressor except for the cooling chambers and the associated heat exchanger units. The heat transfer is facilitated through the heat exchanger units such as 24 and 26 disposed primarily within the cooling chambers. The term of a heat exchanger herein refers to a system that facilitates heat exchange between two fluids separated by a wall or between a fluid and a heat sink due to a temperature difference between the two fluids or between the fluid and the heat sink. In the present case as shown in FIG. 1, the cooling fluid, which is separated from the working fluid (preferably air), may have a sufficiently lower temperature on average than that of the working fluid after being compressed into the cooling chamber. The cooling fluid flows into the heat exchanger unit through an inlet conduit such as 40 or 42, and flows out of the heat exchanger unit through an outlet conduit such as 44 or 46. The cooling fluid may be a gas such as near ambient temperature air, a liquid such as near ambient temperature water, or a two-phase liquid-vapor mixture. Alternatively, for a cascade-cycle refrigeration system, the cooling fluid may be the output working fluid of a higher-temperature cycle. Since the working fluid is a gas, the heat exchange unit as shown schematically is preferably a compact-type heat exchanger with the inclusion of extended surfaces such as fins on the working-fluid side. Various heat transfer enhancement means may also be considered on the cooling-fluid side. Additionally, measures would be taken to prevent the leakage of the working fluid once it is enclosed within a cooling chamber. Unlike a reciprocating compressor, which normally works on a two-stroke cycle, the refrigerator according to the present embodiment as shown in FIG. 1 may be adapted to work on an eight essential stroke cycle. The operation of the refrigerator in accordance with the present invention is described in detail with reference to FIGS. 1-9, with air as the working fluid for convenience.

FIG. 1 illustrates representative conditions for the intake stroke associated with the first cooling chamber 20, while the second cooling chamber 22 has been closed sine the completion of the compression stroke in the last cycle, and the enclosed air is continuously being cooled by a cooling-fluid stream. Intake valve 30 is wide open while discharge valve 32 is closed. The cooling-chamber valve 34 is in an open position as shown in the figure although it has the option of being closed. Piston 18 moves downwardly, admitting an amount of air 31 into the cylinder 16.

Figure 3:
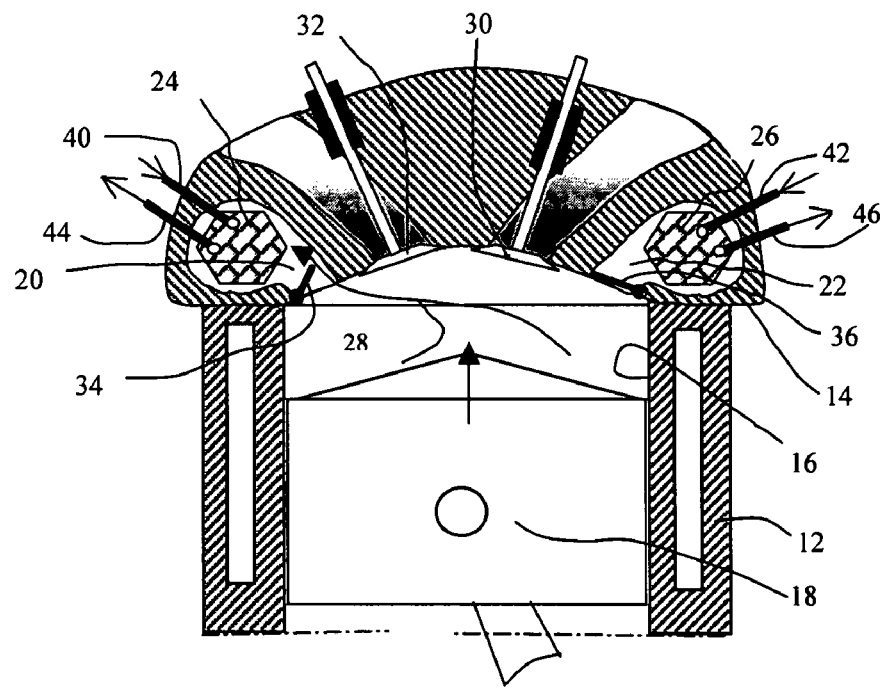
FIG. 3 is a schematic vertical sectional view of a refrigerator unit in accordance with the present invention, illustrating the positions of the valves and piston during a compression stroke associated with the first cooling chamber.

FIG. 3 illustrates representative conditions for the second stroke, which is the compression stroke associated with the first cooling chamber 20. In this case, intake valves 30 and discharge valve 32 are both closed while the second cooling chamber is still in a closed position. Piston 18 moves upwardly, compressing an amount of intake air into the first cooling chamber 20 and raises the temperature of the air in the chamber.

Figure 4:
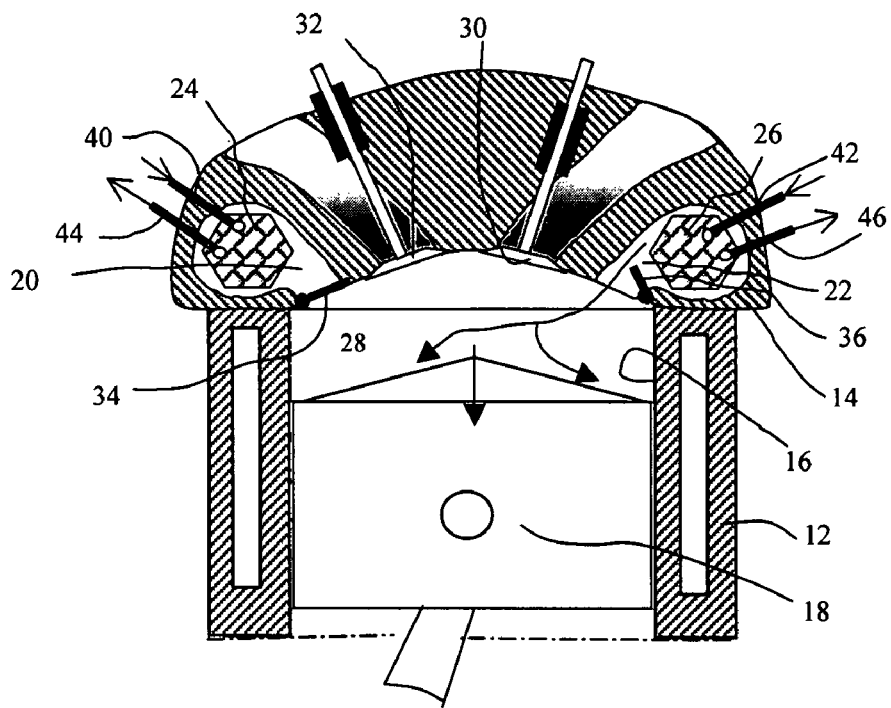
FIG. 4 is a schematic vertical sectional view of a refrigerator unit in accordance with the present invention, illustrating the positions of the valves and piston during an expansion stroke associated with the second cooling chamber.

FIG. 4 illustrates representative conditions for the third stroke, which is the expansion stroke associated with the second cooling chamber 22. In this case, both the intake valve 30 and discharge valve 32 remain closed, while the first cooling-chamber valve 34 is closed, enclosing an amount of compressed air in the first cooling chamber, and the enclosed air is being cooled by a cooling-fluid stream. The enclosed air in the second cooling chamber, after an amount of heat is removed and its temperature is reduced, expands from the second cooling chamber 22 into the cylinder space, returning an amount of work to the piston 18 and further lowering its temperature.

Figure 5:
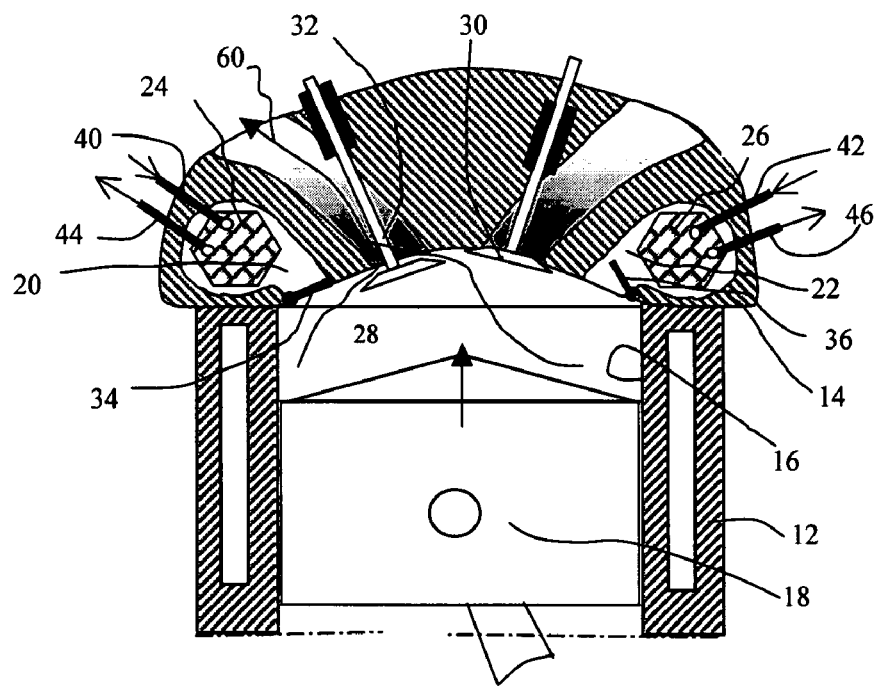
FIG. 5 is a schematic vertical sectional view of a refrigerator unit in accordance with the present invention, illustrating the positions of the valves and piston during a discharge stroke associated with second cooling chamber.

FIG. 5 illustrates representative conditions for the fourth stroke, which is the discharge stroke associated with the second cooling chamber 22. In this case, intake valve 30 and the first cooling chamber remain closed, and the second cooling chamber valve 36 may have the option of being open or closed. The discharge valve 32 is opened at an appropriate timing and piston 18 moves upwardly, discharging an amount of expanded air out of the cylinder as the cooled air output 60.

Figure 6:
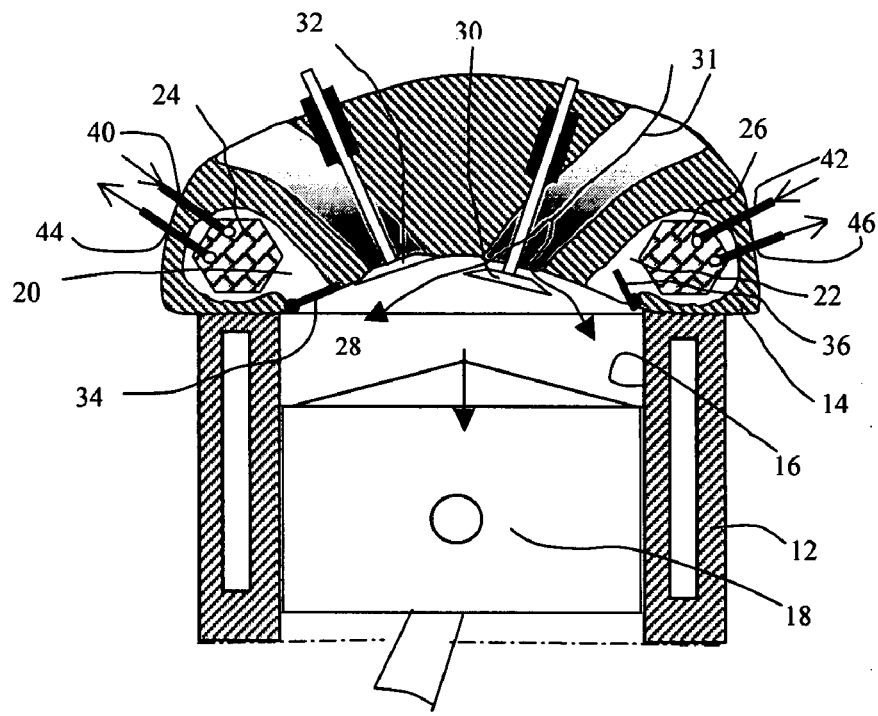
FIG. 6 is a schematic vertical sectional view of a refrigerator unit in accordance with the present invention, illustrating the positions of the valves and piston during an intake stroke associated with the second cooling chamber.

FIG. 6 illustrates representative conditions for the fifth stroke, which is the intake stroke associated with the second cooling chamber 22. In this case, discharge valve 32 is closed and the intake valve 30 is opened, while the first cooling chamber remains closed. Piston 18 moves downwardly, admitting an amount of air into cylinder 16.

Figure 7:
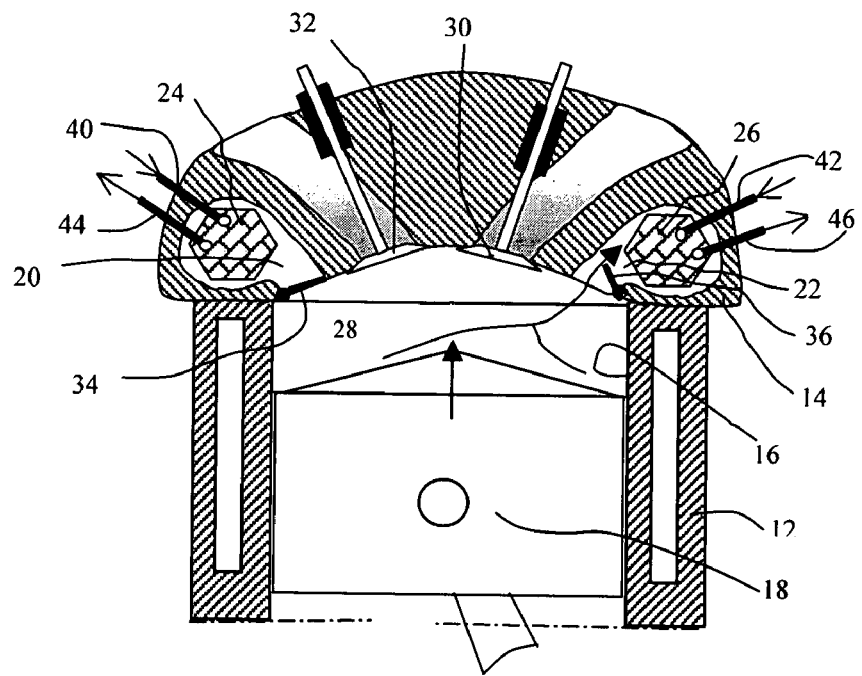
FIG. 7 is a schematic vertical sectional view of a refrigerator unit in accordance with the present invention, illustrating the positions of the valves and piston during a compression stroke associated with the second cooling chamber.

FIG. 7 illustrates representative conditions for the sixth stroke, which is the compression stroke associated with the second cooling chamber 22. In this case, the intake valve 30 is closed while the discharge valve 32 and the first cooling chamber remain closed. Piston 18 moves upwardly, compressing an amount of intake air into the second cooling chamber 22 and raises the temperature of the air in the chamber.

Figure 8:
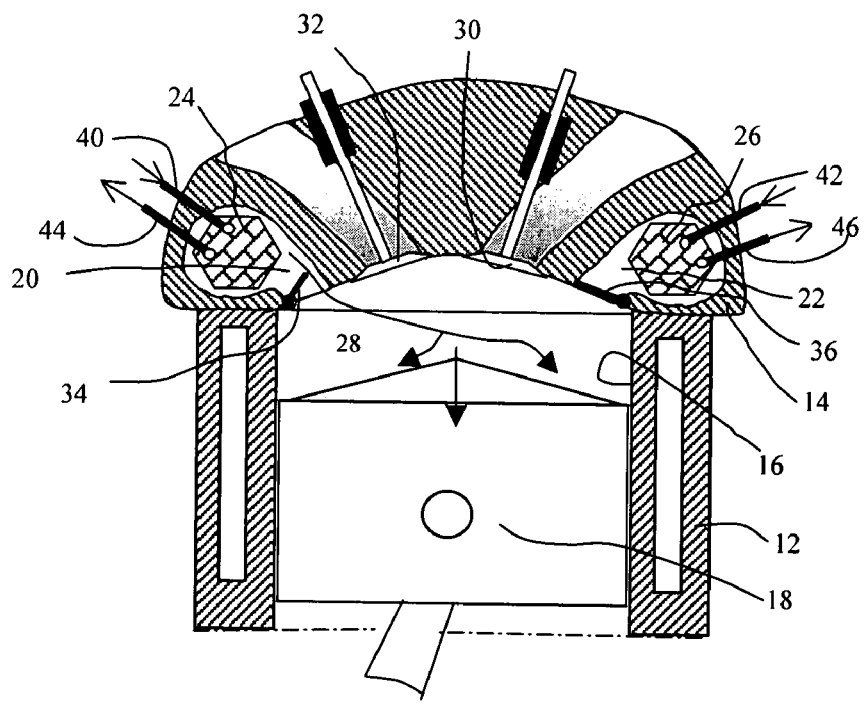
FIG. 8 is a schematic vertical sectional view of a refrigerator unit in accordance with the present invention, illustrating the positions of the valves and piston during an expansion stroke associated with the first cooling chamber.

FIG. 8 illustrates representative conditions for the seventh stroke, which is the expansion stroke associated with the first cooling chamber 20. In this case, the intake valve 30 and discharge valve 32 are both closed. The second cooling-chamber valve 36 is also closed, enclosing an amount of compressed air in the second cooling chamber, and the enclosed air is being cooled by a cooling-fluid stream. After an amount of heat is removed and its temperature is reduced while being enclosed within the first cooling chamber, the air expands from the first cooling chamber 20 into the cylinder space, returning an amount of work to the piston and further reducing its temperature.

Figure 9:
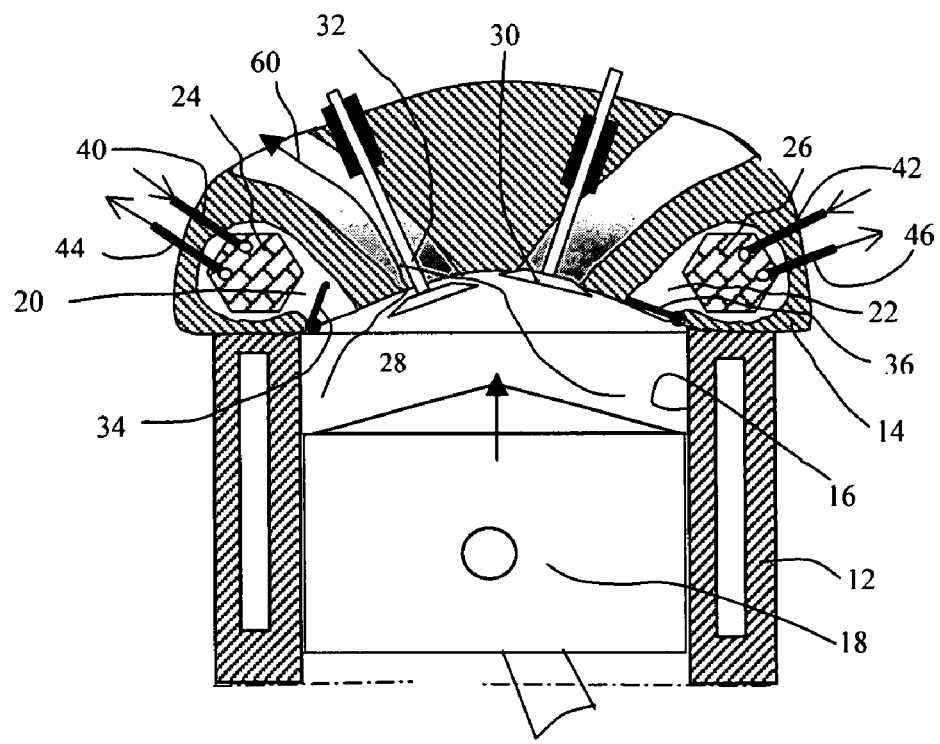
FIG. 9 is a schematic vertical sectional view of a refrigerator unit in accordance with the present invention, illustrating the positions of the valves and piston during a discharge stroke associated with the first cooling chamber.

FIG. 9 illustrates representative conditions for the eighth stroke, which is the discharge stroke associated with the first cooling chamber 20. In this case, the intake valves 30 and the second cooling chamber remain closed, and the first cooling chamber valve 34 may have the option of being open or closed. The discharge valve 32 is opened at an appropriate timing and piston 18 moves upwardly, discharging an amount of expanded air out of the cylinder as the cooled air output 60 to complete the cycle.

It can be seen that the number of discharge strokes in the above cycle is 2, and the number of strokes per discharge stroke is 4, which is the same as the case for a single cooling chamber configuration. As a result, an increase in the heat removal duration between the compression and expansion strokes due to an increase in the number of cooling chambers has not resulted in an increase in the number of strokes per cycle. For a relatively small temperature difference between the working fluid and the cooling fluid due to a relatively small compression ratio for a present refrigerator using a gaseous working fluid, this increased heat removal duration may be critical to facilitate a sufficient temperature reduction before the expansion and produce a discharged working fluid with a sufficiently low temperature after the expansion. It is also known that for a given operating speed, the number of strokes per discharge in a cycle will significantly affect the cooling capacity and the coefficient of performance (COP) of a refrigerator. Therefore, it is essential to maintain the number of strokes per discharge within an acceptably low level.

In the above disclosure or those that will follow, the refrigerator system may have a closed-loop configuration, wherein the cooled working fluid being discharged out of the refrigerator may flow through another heat exchanger and receive an amount of heat from a space or object being cooled (not shown), and the working fluid is then directed back to the refrigerator through an intake port as an intake charge. Alternatively, said refrigerator system may have an open-loop configuration, wherein during the discharge process, the cooled air may be directly released to a space or an object being cooled (not shown), and the intake fluid may be the air from a space being cooled or the ambient air.

One skilled in the art may have noted that when describing the discharge strokes (the fourth and eighth strokes), the discharge valve is said to open at an appropriate timing. This may be necessary when the cooled air is directly discharged into a cooled space that has a pressure near the ambient. Since at the end of expansion stroke, the pressure of the working fluid in some cases may be below the ambient pressure. As a result, the discharge valve may be opened around the time when the pressure of the working fluid is equal to the ambient pressure in the discharge stroke.

One skilled in the art may readily recognize that the eight strokes described above are essential strokes in a cycle according to the present invention. In fact, a refrigerator may be adapted to operate on a cycle having any number of strokes. Non-essential strokes to this invention may be added before the first stroke and after the eighth stroke, or be inserted among the eight strokes mentioned above.

One skilled in the art may also recognize that the above descriptions on the cycle are based on representative or ideal conditions. However, like prior arts in this field, the general description does not exclude common practices under practical operational considerations. For instance, when it is stated that a chamber valve as well as the associated chamber are in an open condition in an upwardly stroke, it does not exclude an earlier closing of the valve and chamber before the top dead center. Similarly, the common practices of variable valve timing and lift as well as valve overlap periods will be still applicable to the operation of the valves in the present invention. Therefore, in the context of the cooling-chamber valves, such as valves 34 and 36, early/late opening or early/late closing as well as valve overlap periods may be common practices for the refrigerator according to the present invention. In connection with the cooling-chamber valves, early/late opening or early/late closing of a cooling chamber may also be common practices according to the present invention.

Additionally, the cycle described above may be just one of the feasible cycles based on the refrigerator platform in accordance with the present invention. For example, in the above cycle, the fifth and sixth strokes associated with the second cooling chamber may be replaced by the expansion stroke and discharge stroke associated with the first cooling chamber, and the seventh and eighth strokes associated with the first cooling chamber may then be replaced by the intake and compression strokes associated with the second cooling chamber. However, with these alternations, the time period for a working fluid to remove heat under a constant volume may be cut in half.

For the two-cooling-chamber configuration as shown in FIGS. 1-9, each cooling chamber is given a 720 degree of crank angle or a time period of four strokes for the air enclosed within the chamber to transfer heat to the cooling fluid. It is well known that the amount of heat that can be transferred from the air to a cooling stream is directly related to the time period during which the air is in contact with the cooler surfaces of the heat exchanger unit, such as 24 or 26. If this amount of time period (or crank angle) is not sufficient to remove a sufficiently large amount of heat from the working fluid, each cylinder may be equipped with more than two cooling chambers, and the crank angle available for cooling down the air enclosed within a cooling chamber will thus be increased accordingly. For example, for a cylinder equipped with three cooling chambers, the air entering the first cooling chamber during the compression stroke may remain to be enclosed and continue to transfer heat to the cooling fluid over the next eight strokes serving other cooling chambers before the air is released from the first cooling chamber into the cylinder space in the expansion stroke. These eight strokes serving other cooling chambers may be the expansion, discharge, intake and compression strokes for the second cooling chamber and the expansion, discharge, intake and compression strokes for the third cooling chamber. As a result, the crank angle (CA) available for the air enclosed in a cooling chamber to transfer heat to the cooling fluid under a constant volume is $$2\times720=1440(CA)$$

and the refrigerator may operate on a twelve-stroke cycle. In general, for a cylinder equipped with n cooling chambers, where n is an integer, the crank angle that is available for the compressed air in a cooling chamber to transfer heat to the cooling fluid under a constant volume is:

$$720(n-1)(CA)$$

and the system may operate on a 4n stroke cycle, where n is an integer greater than or equal to 2. It should be emphasized that the above evaluation is based on the assumption that the operating conditions for all cooling chambers in a cyclic are similar, and ideally, the curve of temperature versus time or the curve of pressure versus time associated with a cooling chamber may be obtained through shifting in time the corresponding curve associated with another cooling chamber. The above description excludes the existence of non-essential strokes. With the inclusion of non-essential strokes, both crank angle and the number of strokes in a cycle may be increased.

Figure 10:
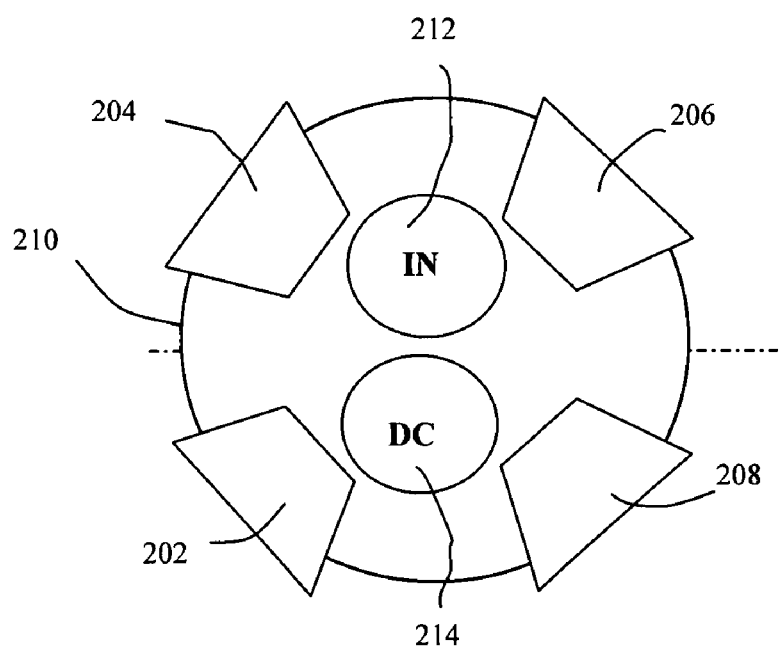
FIG. 10 is a schematic top sectional view of a refrigerator unit in accordance with the present invention, illustrating the arrangements of the cooling chambers and valves with the configuration of four cooling chambers per cylinder.

FIG. 10 illustrates schematically a top sectional view of a refrigerator unit with four cooling chambers, 202-208, for a cylinder 210, as well as an intake valve 212 and a discharge valve 214 in accordance with the present invention. Although theoretically a refrigerator may be equipped with any number of cooling chambers per cylinder, in practice the number of cooling chambers per cylinder may be limited due to the space and various operational constraints.

In the refrigerator as disclosed above, the intake and discharge are realized respectively through an intake stroke and a discharge stroke. It is known that the frictional loss associated with the intake and discharge strokes may represent a considerable portion of the mechanical work consumption of the refrigerator and subsequently have a negative effect on the COP of the system. For this reason, a refrigerator employing a scavenging process to facilitate the discharge and intake may be constructed.

Figure 11:
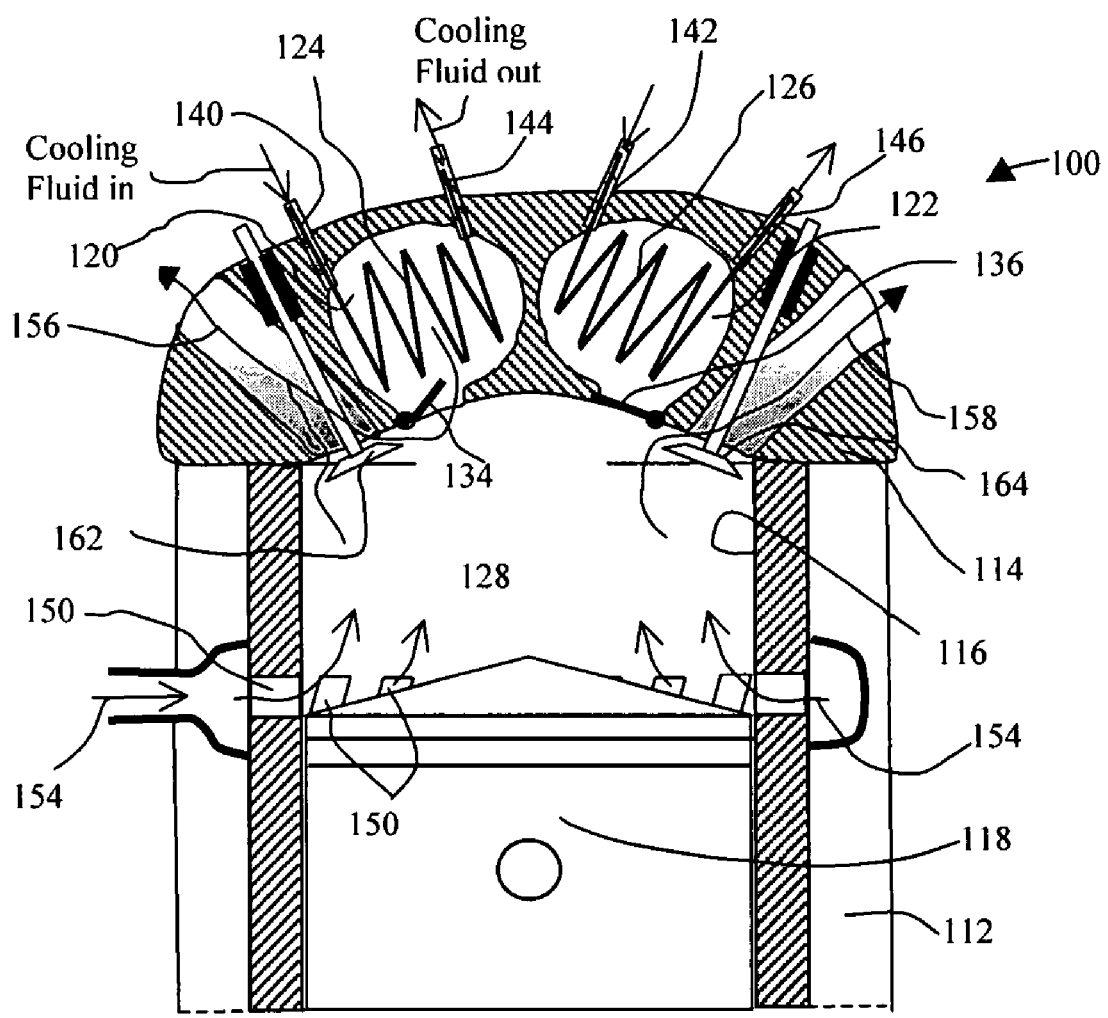
FIG. 11 is a schematic vertical sectional view of a refrigerator unit in accordance with the present invention, illustrating the positions of the valves and piston during a scavenging process associated with the first cooling chamber.

FIG. 11 illustrates such a refrigerator 100, wherein the intake and discharge are realized through a scavenging process. Said refrigerator 100 includes a cylinder block 112 and a cylinder head 114. The cylinder block 112 contains at least a cylinder 116 and a piston 118 that is slidably disposed within the cylinder 116. When the piston 118 reaches the top dead center, cylinder space 128, as defined by the bottom face of the cylinder head 114, the top face of the piston 118, and the sidewall of the cylinder 116, may be minimized. Associated with each refrigerator cylinder 116, the cylinder head 114 defines a first cooling chamber 120 and a second cooling chamber 122. Associated with the cooling chambers, a first heat exchanger unit 124 and a second heat exchanger unit 126 are disposed, respectively, within the cooling chambers 120 and 122. The cooling fluid flows into the heat exchanger unit through an inlet conduit such as 140 or 142, and flows out of the heat exchanger unit through an outlet conduit such as 144 or 146. The first cooling chamber 120 is provided with an opening port to the cylinder space, and the opening port may be opened or closed by a cooling-chamber valve 134 that may establish or block communication between the first cooling chamber and the cylinder space. Similarly, the second cooling chamber 122 is provided with a cooling-chamber valve 136 that may establish or block communication between the second cooling chamber and the cylinder space. The cooling-chamber valve as well as the intake and discharge valves as illustrated herein is schematic in nature; they may be, but not limited to, puppet valves, slide valves, rotary valves, butterfly valves, switch valves, gate valves, or ball valves. The scavenging method as shown in FIG. 11 is a through scavenge or uniform scavenge, which uses inlet ports in the cylinder wall, uncovered by the piston 118 as it approaches the bottom dead center. Intake charge 154, such as a slightly compressed air, flows into the cylinder space and pushes out the expanded working fluid as cooled air output through discharge ports opened by discharge valves 162 and 164. To reduce the power consumption of the refrigerator, the slightly compressed intake air may be cooled down close to the ambient temperature before it is directed to intake ports. The refrigerator according to the present embodiment as shown in FIG. 11 may be adapted to work on a four essential stroke cycle, and the operation of the refrigerator is described in detail with reference to FIGS. 11-16, with air as the working fluid for convenience.

FIG. 11 illustrates representative conditions for the scavenging process associated with the first cooling chamber 120, while the second cooling chamber 122 has been closed since the completion of the compression stroke in the last cycle, and the enclosed air is being cooled by a cooling-fluid stream. In this process, when the piston 118 approaches the bottom dead center, the discharge valves 162 and 164 are opened and the expanded working fluid in the cylinder space as well as in the first cooling chamber 120 may rush out of the cylinder if it has a higher pressure compared to the discharge port pressure after returning an amount of work to the piston in an expansion stroke of the past cycle. However, if the pressure of the expanded working fluid is lower than the pressure at discharge ports, the opening of the discharge valves may be delayed. Intake working fluid 154 such as a slightly compressed air flows into the cylinder through the inlet ports 150 in the cylinder wall uncovered by the piston to push the remaining expanded working fluid out of the cylinder as the cooled working fluid output 156 or 158.

Figure 12:
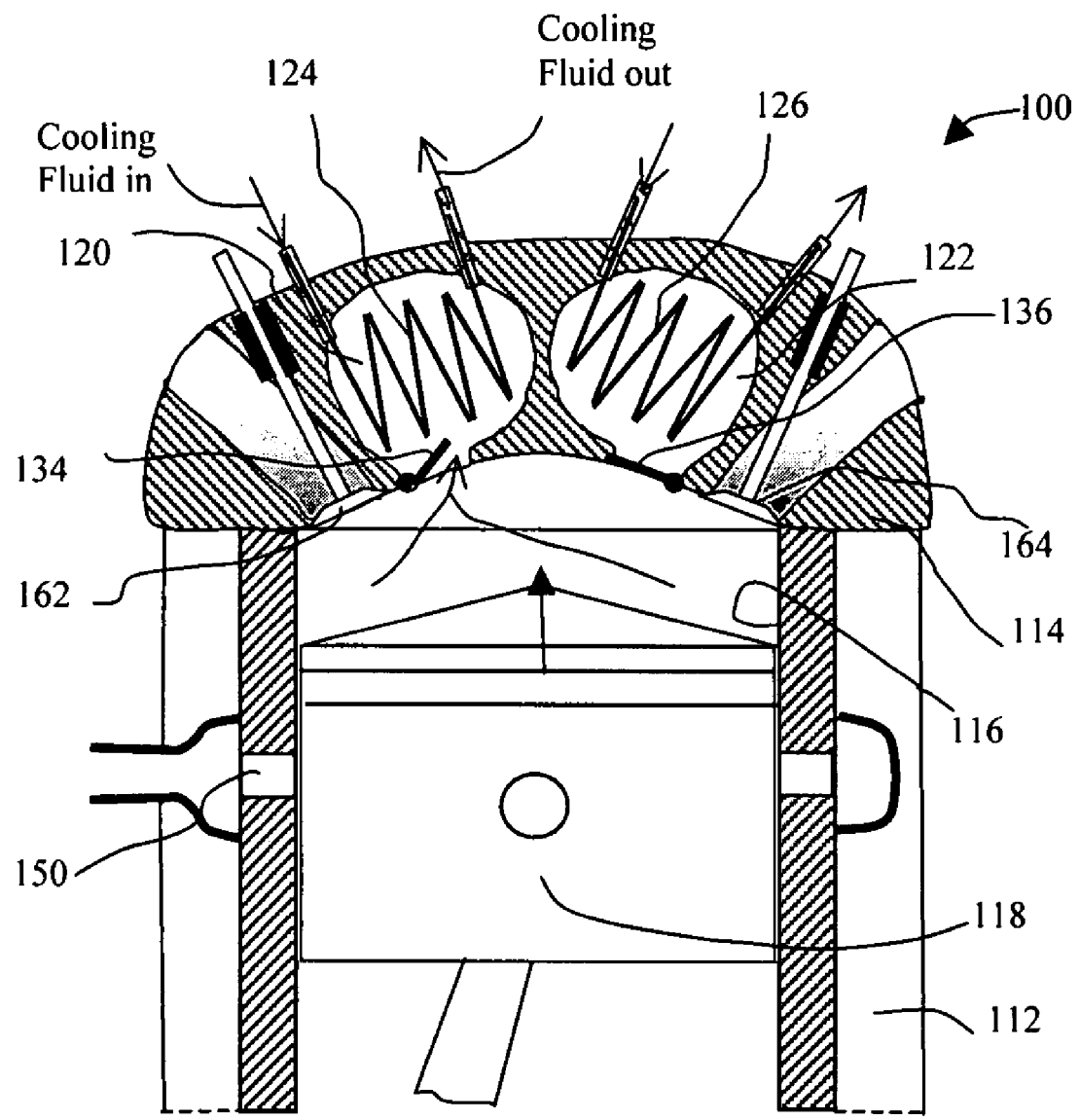
FIG. 12 is a schematic vertical sectional view of a refrigerator unit in accordance with the present invention, illustrating the positions of the valves and piston during a compression stroke associated with the first cooling chamber.

FIG. 12 illustrates representative conditions for the first stroke, which is the compression stroke associated with the first cooling chamber 120. In this case, discharge valves 162 and 164 are closed, and the piston 118 moves from the bottom dead center to the top dead center, closing the inlet ports 150, while the second cooling-chamber is still in a closed position. As the piston 18 moves upwardly, it compresses an amount of intake working fluid into the first cooling chamber 120 and raises the temperature of the working fluid.

Figure 13:
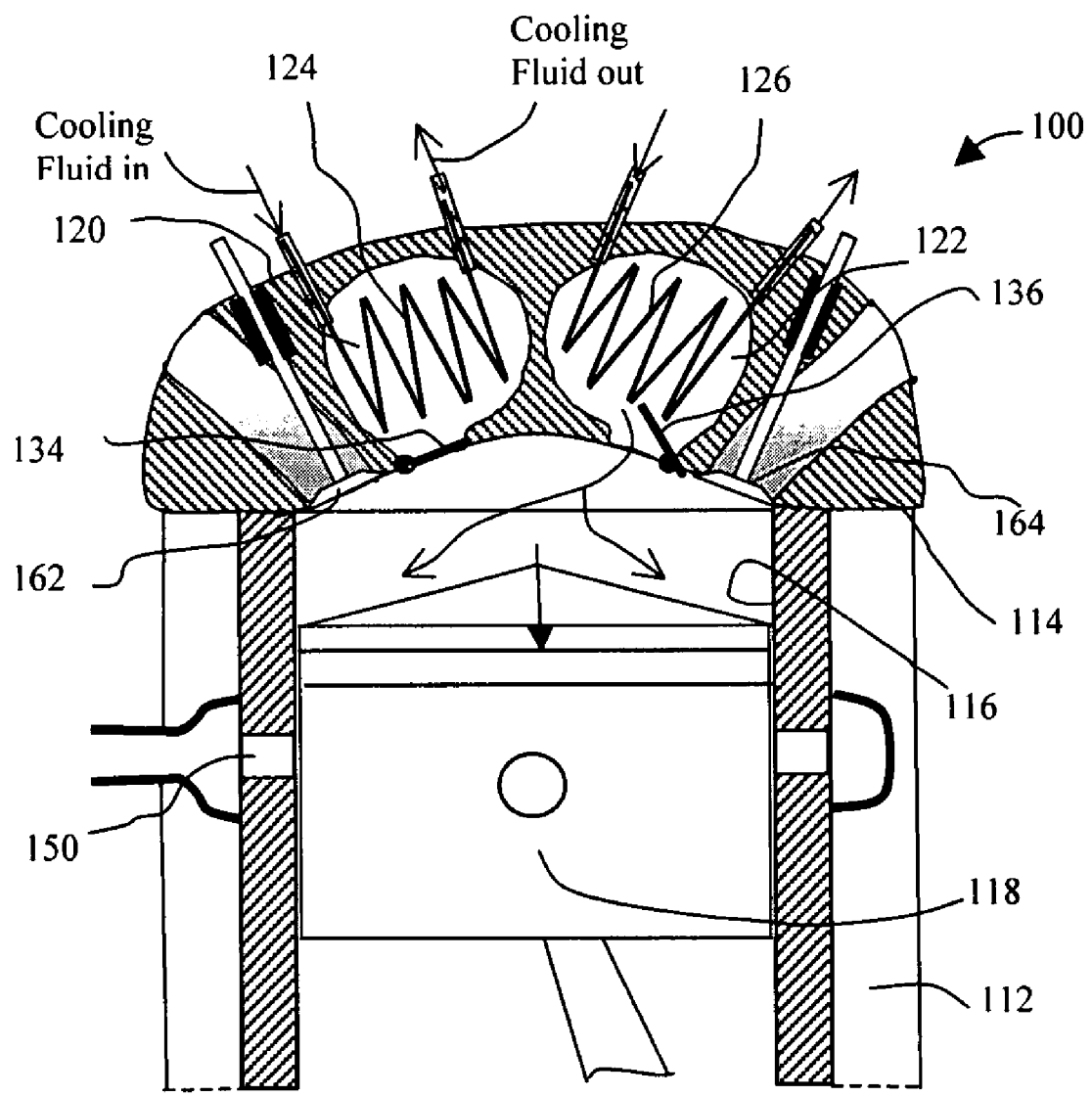
FIG. 13 is a schematic vertical sectional view of a refrigerator unit in accordance with the present invention, illustrating the positions of the valves and piston during an expansion stroke associated with the second cooling chamber.

FIG. 13 illustrates representative conditions for the second stroke, which is the expansion stroke associated with the second cooling chamber 122. In this case, the discharge valves 162 and 164 remain closed, while the first cooling-chamber valve 134 is also closed, enclosing an amount of compressed working fluid in the first cooling chamber, and the enclosed working fluid is being cooled by a cooling-fluid stream. After an amount of heat is removed and its temperature is reduced while being enclosed, the working fluid in the second cooling chamber 122 expands into the cylinder space, returning an amount of work to the piston 118 and further lowering its temperature.

Figure 14:
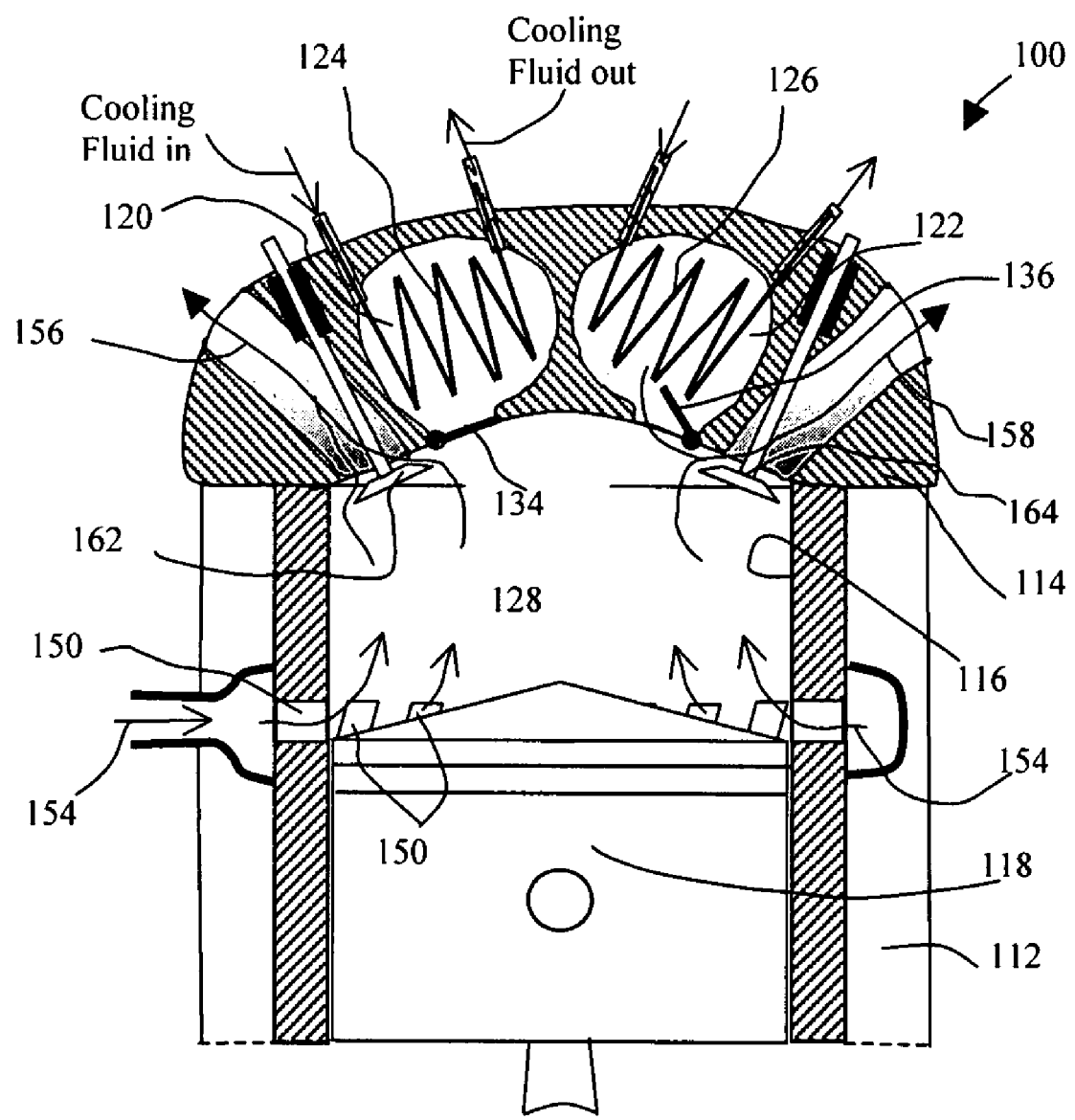
FIG. 14 is a schematic vertical sectional view of a refrigerator unit in accordance with the present invention, illustrating the positions of the valves and piston during a scavenging process associated with the second cooling chamber.

FIG. 14 illustrates representative conditions for the scavenging process associated with the second cooling chamber 122, while the first cooling chamber 120 remains in a closed condition. In this process, when the piston 118 approaches the bottom dead center, the discharge valves 162 and 164 are opened, the expanded working fluid in the cylinder space as well as in the second cooling chamber may rush out of the cylinder if it has a higher pressure compared to the discharge port pressure. However, if the pressure of the expanded working fluid is lower than the pressure at discharge ports, the opening of the discharge valves may be delayed. Intake working fluid 154, such as a slightly compressed air, flows into the cylinder through inlet ports 150 in the cylinder wall uncovered by the piston to push the remaining expanded working fluid out of the cylinder as the cooled working fluid output 156 or 158.

Figure 15:
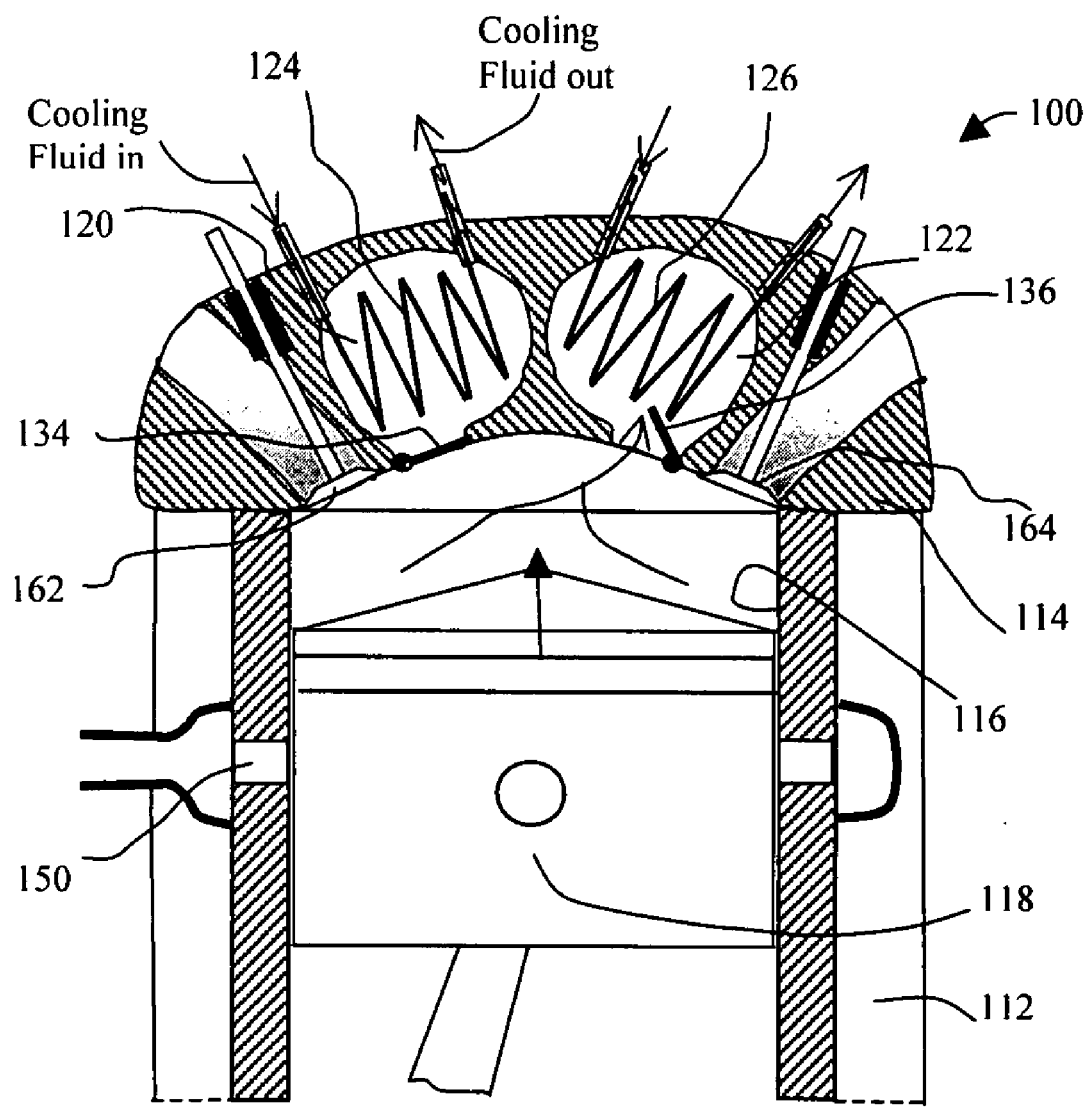
FIG. 15 is a schematic vertical sectional view of a refrigerator unit in accordance with the present invention, illustrating the positions of the valves and piston during a compression stroke associated with the second cooling chamber.

FIG. 15 illustrates representative conditions for the third stroke, which is the compression stroke associated with the second cooling chamber 122. In this case, discharge valves 162 and 164 are closed, and the piston 118 moves from the bottom dead center to the top dead center, closing the inlet ports 150, while the first cooling chamber is still in a closed position. As the piston 18 moves upwardly, it compresses an amount of intake working fluid into the second cooling chamber 122 and raises the temperature of the working fluid.

Figure 16:
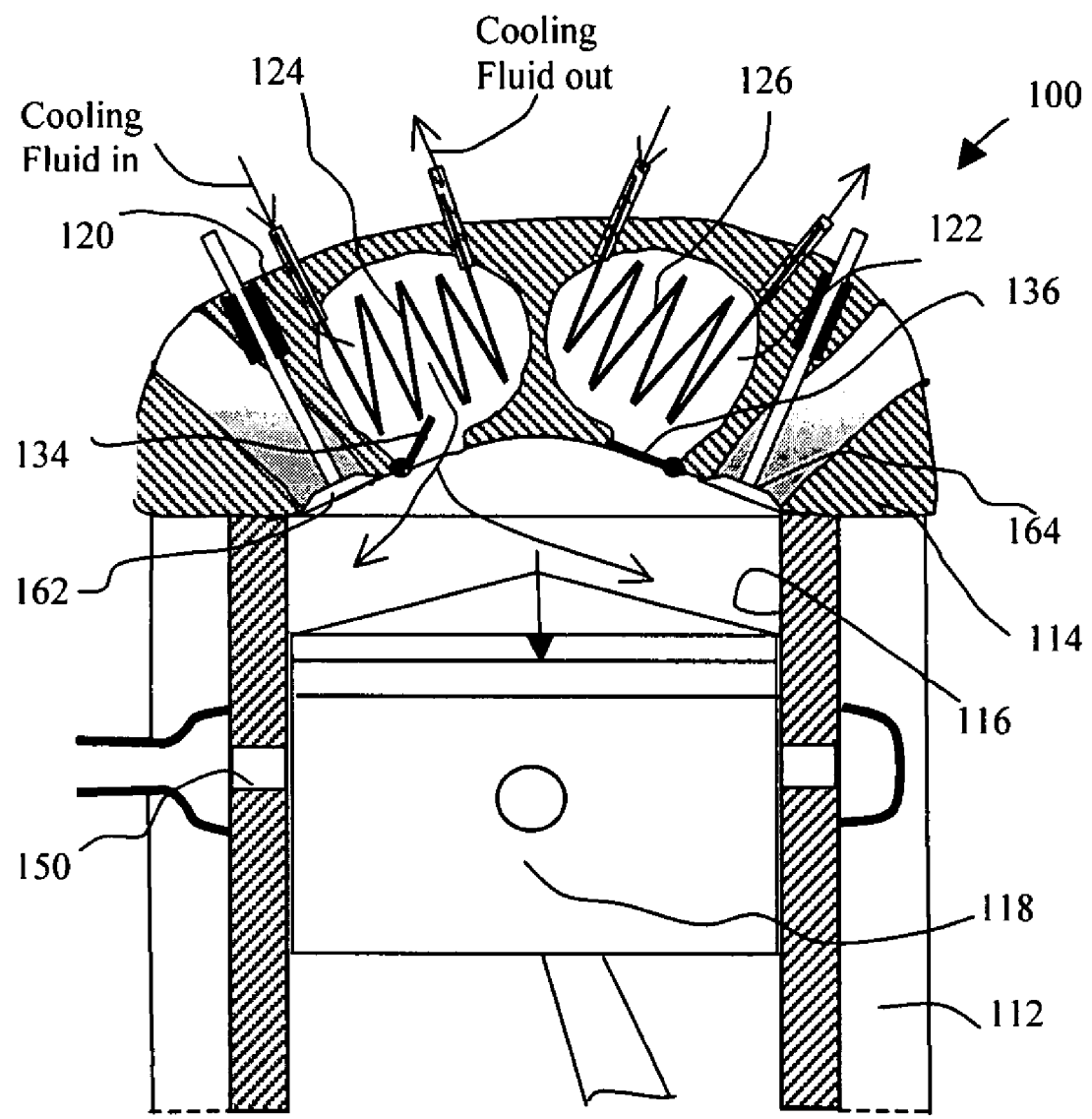
FIG. 16 is a schematic vertical sectional view of a refrigerator unit in accordance with the present invention, illustrating the positions of the valves and piston during an expansion stroke associated with the first cooling chamber.

FIG. 16 illustrates representative conditions for the fourth stroke, which is the expansion stroke associated with the first cooling chamber 120. In this case, the discharge valves 162 and 164 remain closed, while the second cooling-chamber valve 136 is closed, enclosing an amount of compressed working fluid in the second cooling chamber, and the enclosed working fluid is being cooled by a cooling-fluid stream. After an amount of heat is removed and its temperature is reduced while being enclosed, the working fluid in the first cooling chamber 120 expands into the cylinder space, returning an amount of work to the piston 118 and further lowering its temperature.

The number of discharge processes in the above cycle is 2, and the number of strokes per discharge in the cycle is also 2, which is the same as the case for a single cooling chamber. As a result, an increase in the heat removal duration between the compression and expansion strokes due to an increase in the number of cooling chambers has not resulted in an increase in the number of strokes for each cycle. As discussed before, a smaller number of strokes per discharge in a cycle will have the benefits of increasing the cooling capacity and coefficient of performance of a refrigerator.

For the two cooling-chamber configuration as shown in FIGS. 11-16, each cooling chamber is given a 360 degree of crank angle or a time period of two strokes for the working fluid enclosed within the cooling chamber to transfer heat to the cooling fluid. If this amount of time period (crank angle or stroke) is not sufficient, each cylinder may be equipped with more than two cooling chambers, and the crank angle available for cooling down the working fluid enclosed within a cooling chamber will thus be increased accordingly. In general, for a cylinder equipped with n cooling chambers, the crank angle that is available for the working fluid in a cooling chamber to transfer heat to the cooling fluid is:

$$360(n-1)(CA)$$

and the refrigerator may operate on a 2n stroke cycle, where n is an integer greater than or equal to 2. It should be emphasized that the above evaluation is based on the assumption that the operating conditions for all cooling chambers in a cyclic are similar, and ideally, the curve of temperature versus time or the curve of pressure versus time associated with a cooling chamber may be obtained through shifting in time the corresponding curve associated with another cooling chamber.

It should be mentioned that the refrigerators as shown in FIGS. 11-16 employ a so called through scavenging or uniform scavenging process for discharge and intake purposes. However, other scavenging processes, such as through scavenging via opposed piston, crankcase scavenging, cross scavenging, cross scavenging with discharge valves, and loop scavenging, are equally applicable based on the principle of the present invention, although they are not explicitly shown herein. Scavenging processes utilizing intake ports in the cylinder head without intake ports in the cylinder wall may also be employed in the present invention, which may be particularly important to a present refrigerator when the cooled air output is directly discharged into a space or an object being cooled to reduce the lubricating oil consumption.

Figure 17A:
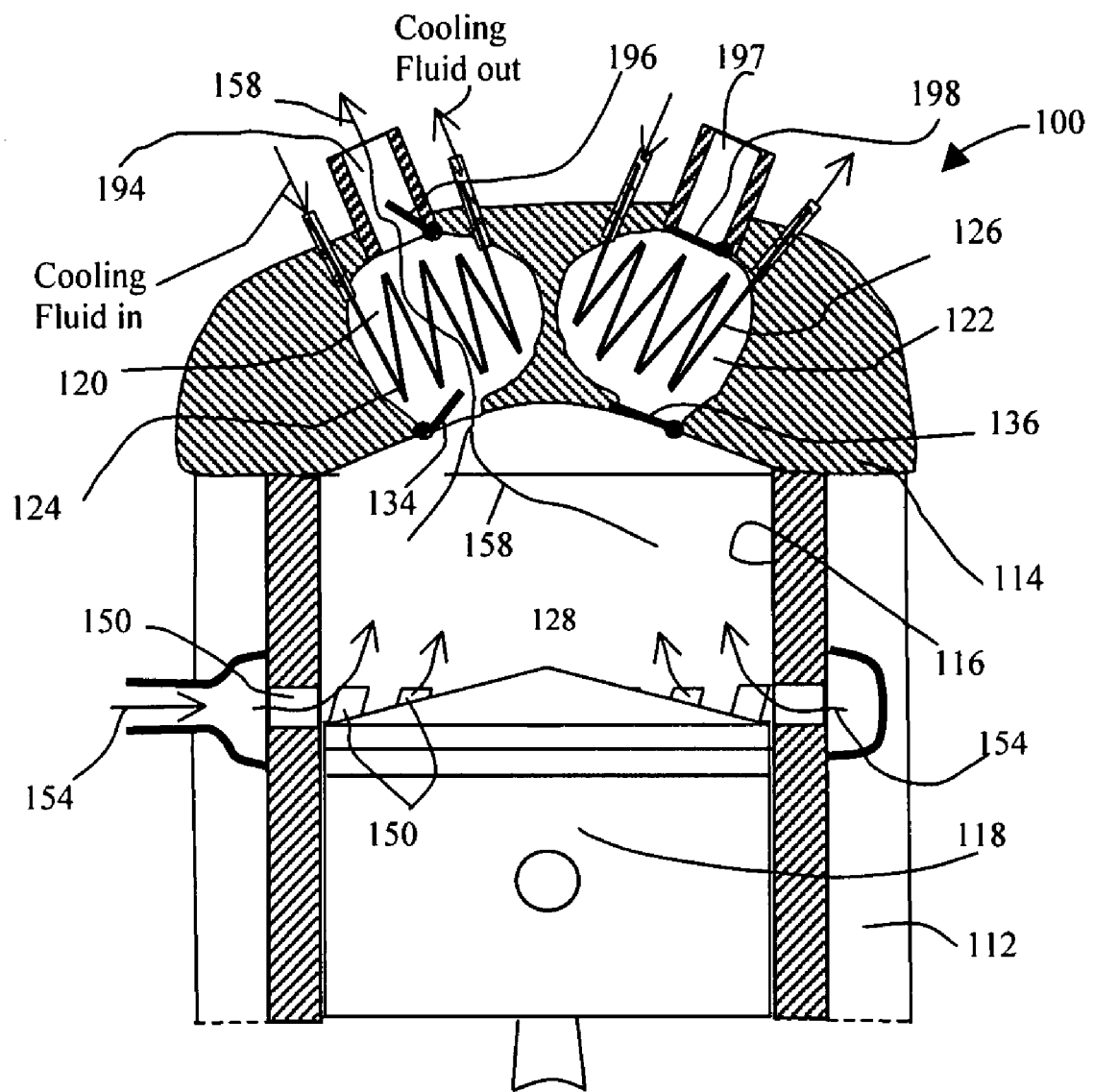
FIG. 17a is a schematic vertical sectional view of a refrigerator unit in accordance with the present invention, illustrating the positions of the valves and piston during a scavenging process with discharge ports being directly integrated with the cooling chambers.

Additionally in the refrigerators as shown in FIGS. 11-16, discharge ports are shown as separated from the cooling chambers. However, the discharge port may be integrated with the cooling chamber as shown in FIG. 17a, wherein a discharge port 194 in conjunction with a discharge valve 196 is directly integrated with the cooling chamber 120 and a discharge port 197 in conjunction with a discharge valve 198 is directly integrated with the cooling chamber 122. Through discharge ports 194 or 197, the expanded working fluid 158 in a cooling chamber may be substantially pushed out of the cooling chamber by the intake working fluid 154. It may be readily shown that for a refrigerator using a gaseous working fluid, a smaller compression ratio in the compression stroke may produce a higher coefficient of performance. However, the volume of the expanded working fluid remaining in the cooling chamber could be relatively large compared to the volume of the cylinder space when the compression ratio is substantially low. For this reason, the configuration as shown in FIG. 17a may be particularly important to a present refrigerator having a smaller compression ratio, and may result in a more complete discharge of the expanded working fluid 158 in both the cylinder space and the cooling chamber as the cooled working fluid output to produce a larger cooling capacity and a higher coefficient of performance of the refrigerator.

Figure 17B:
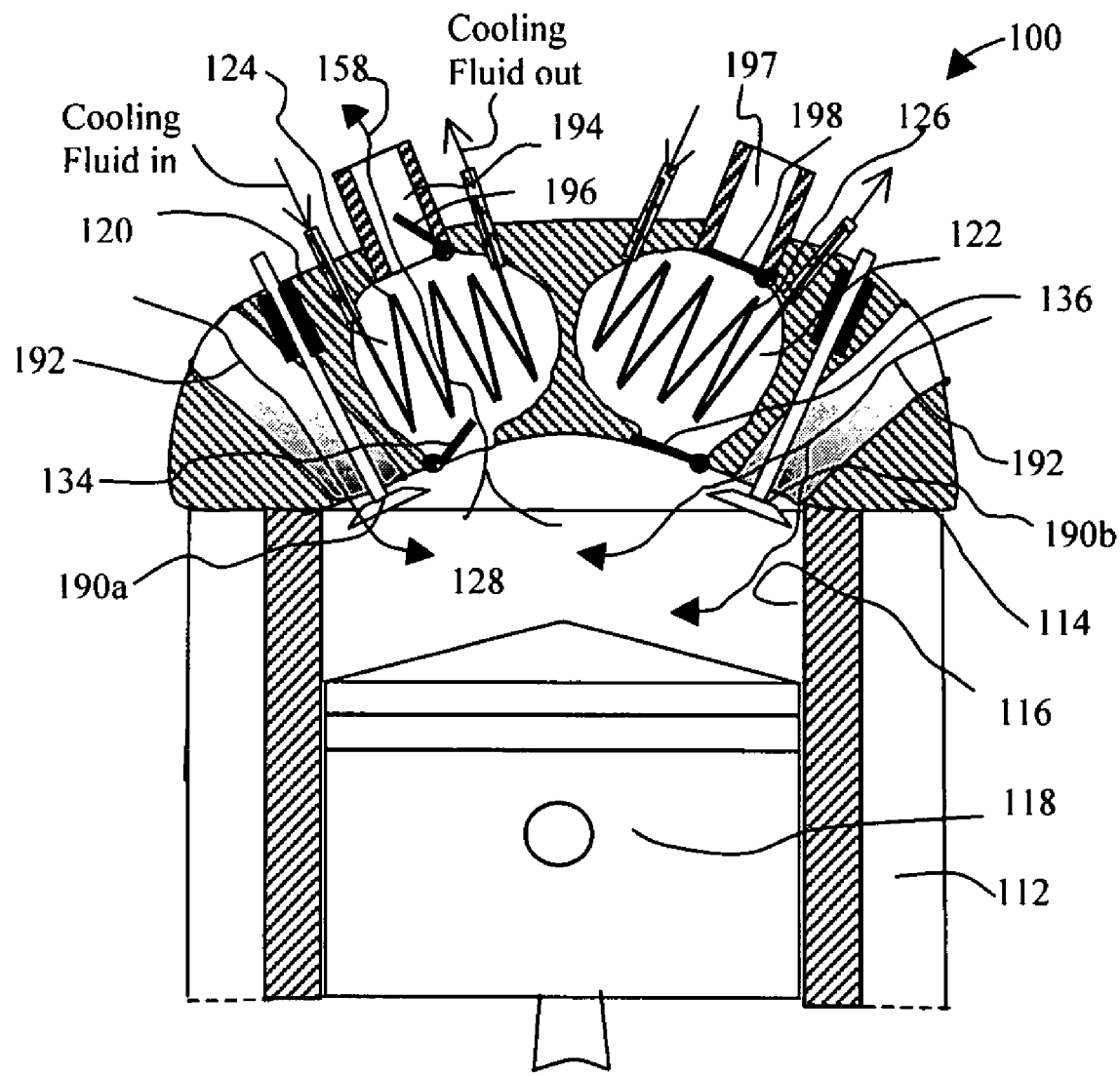
FIG. 17b is a schematic vertical sectional view of a refrigerator unit in accordance with the present invention, illustrating one of the options of combining the directly integrated discharge port with intake ports in the cylinder head to create a through scavenging process.

The configuration as shown in FIG. 17a may also be combined with a scavenging process utilizing intake ports in the cylinder head without intake ports in the cylinder wall to reduce lubricating oil consumption, as shown in FIG. 17b that illustrates a scavenging process for cooling chamber 120. In this case, intake working fluid 192 flows through both intake valves 190a and 190b to create a through scavenging process for displacing the expanded working fluid 158 in both cylinder space 128 and cooling chamber 120, and discharge it as the cooled working fluid output of the refrigerator.

In the above descriptions, the motion of a piston is linked to the rotation of a crankshaft through a connecting rod. However, the spirit of the present invention is not limited to the case with a crankshaft. The same principles can be readily applied to other piston/cylinder structures such as a free piston configuration without a crankshaft.

Figure 18:
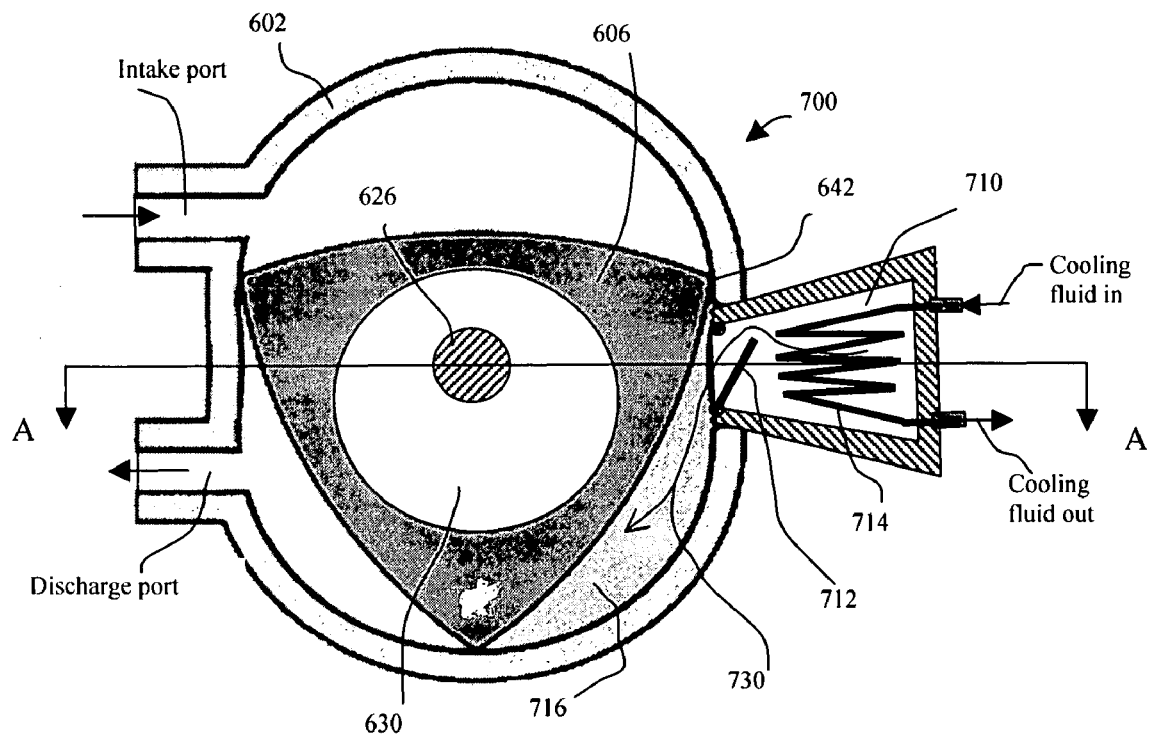
FIG. 18 is a schematic sectional view of a rotary refrigerator unit in accordance with the present invention, illustrating the positions of valves and rotor during an expansion stage associated with the first cooling chamber.
Figure 19:
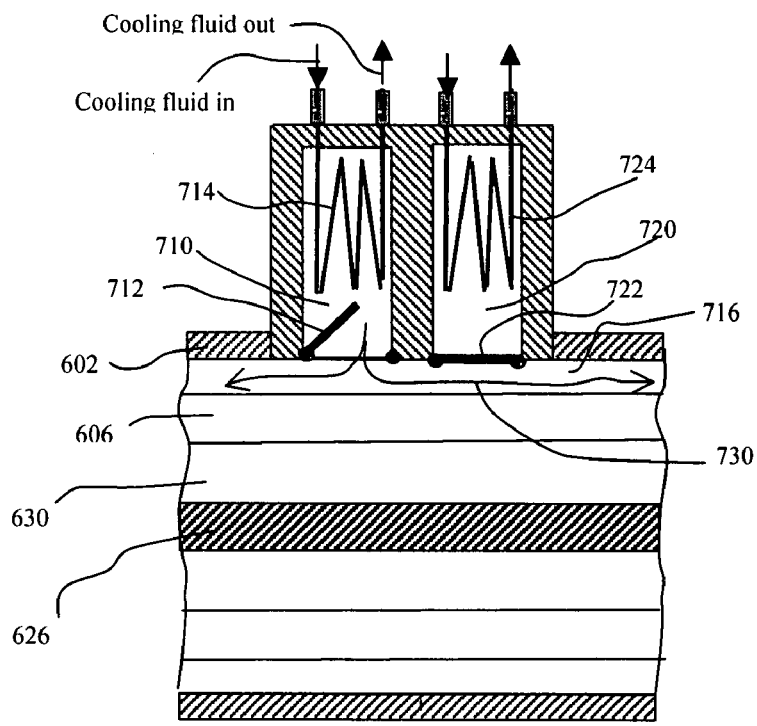
FIG. 19 is a cross-sectional view in the direction A-A of FIG. 18, showing the arrangement of two cooling chambers in an axial direction of the rotary refrigerator.

Having disclosed the configurations and working principles of the refrigerators based on the structure of a piston/cylinder assembly, a refrigerator based on the rotor structure of a Wankel rotary engine is disclosed. FIG. 18 illustrates a sectioned view of a rotary refrigerator 700 and FIG. 19 is a cross-sectional view in the direction A-A of FIG. 18. Referring now to FIG. 18, a rotary refrigerator 700 comprises an oval-like housing 602 surrounding a three-sided rotor 606 having roughly a triangle shape, said rotor 606 being mounted on an eccentric drive shaft 626 having a offset lobe 630 and passing through the rotor 606, and a first cooling chamber 710 and a second cooling chamber 720 (FIG. 19) that are located in a periphery location of the housing 602 and are arranged in an axial direction of the housing 602. The cooling chamber 710 has a port in communication with space 716 formed between the inner surface of the housing 602 and the outer surface of the rotor 606, a cooling chamber valve 712 that may block or establish communication between the cooling chamber 710 and space 716, and a heat exchanger unit 714, wherein a cooling fluid flows into the heat exchanger unit through an inlet conduit and flows out of the heat exchanger unit through an outlet conduit. Similarly cooling chamber 720 has a cooling chamber valve 722 and a heat exchanger unit 724. More specifically, the conditions shown in FIGS. 18 and 19 correspond to an expansion stage associated with the first cooling chamber 710, wherein chamber valve 712 is opened and the working fluid 730 (such as air), after transferring an amount of heat to the cooling fluid to reduce its temperature, is released from chamber 710 and flows both radially and axially into space 716 to return an amount of work to the rotor 606, while chamber valve 722 associated with the second cooling chamber 720 has been closed since the completion of the compression stage in the last cycle, enclosing an amount of working fluid in the chamber 720, and heat is being transferred to the cooling fluid through the heat exchanger unit 724 from the working fluid enclosed therewithin. After returning an amount of work to the rotor and further lowering its temperature, working fluid 730 is discharged out of the housing 602 through a discharge port as a cooled working fluid output (not shown).

Following the expansion stage comes the compression stage for the first cooling chamber wherein the first cooling chamber valve 712 remains open and a amount of intake working fluid is compressed into the first cooling chamber 710 while the second cooling chamber valve 722 remains closed (not shown).

The next stage is the expansion stage for the second cooling chamber 720, wherein chamber valve 722 is opened, and the working fluid, after an amount of heat is removed and its temperature is reduced, is released from chamber 720 and flows both radially and axially into space 716 to return an amount of work to the rotor 606, while chamber valve 712 associated with the first cooling chamber 710 is closed, enclosing an amount of compressed working fluid, and heat is being transferred to the cooling fluid from the working fluid enclosed therewithin through the heat exchanger unit 714 (not shown). After returning an amount of work to the rotor and further lowering its temperature, the expanded working fluid from the second cooling chamber is discharged out of the housing 602 through a discharge port as a cooled working fluid output (not shown).

The next stage for the cycle is the compression stage for the second cooling chamber 720, wherein the second cooling chamber valve 722 remains open and an amount of intake fluid is compressed into the second cooling chamber 720 while the first cooling chamber valve remains closed (not shown).

For the above operation with a two cooling chamber configuration, each chamber is given a time period of two stages for heat transfer to the cooling fluid from the charge enclosed. However, if this time period is still not sufficient, more than two cooling chambers associated with a rotor may be employed. In this case, the time period available for heat transfer related to the working fluid enclosed within a cooling chamber may be 2(n-1) stages, where n is the number of cooling chambers per rotor.

It should be pointed out that although the rotary refrigerator as described herein may have a different mechanical structure, the discussions in this disclosure associated with the piston/cylinder refrigerator for various subjects, such as cooling chambers, heat exchangers, and valves, will be readily applicable to the rotary refrigerator herein because of similar operating principles, and therefore will, not be repeated.

In the above disclosures for both reciprocating and rotary refrigerators, multiple cooling chambers are employed for increasing the heat removal duration for the enclosed working fluid. However, the increase of heat removal duration may also be realized with a single cooling chamber per cylinder (not shown). In this configuration, after an amount of working fluid is compressed into the cooling chamber in the compression stroke, the working fluid may remain to be enclosed within the chamber with a cooling chamber valve during the following strokes. However, the piston may not have an opportunity to serve the working fluid associated with another cooling chamber during the following strokes, and as a result the number of strokes per discharge will be increased by at least 2. In a further situation if the cooling chamber valve in a single cooling chamber configuration is removed and the working fluid will not be enclosed after the compression stroke is complete, the number of strokes per discharge may not be increased. However, the benefits of increasing the heat removal duration associated with a multi-cooling chamber configuration will also be eliminated. As a result, this configuration of a single cooling chamber without a cooling chamber valve may only be viable if the heat transfer coefficient between the working fluid and the heat sink is very high near the top dead center or a gaseous working fluid having a high thermal conductivity is being used.

It is understandable that one of the most important components to enable proper operation of the present refrigerator is the cooling-chamber valve. As mentioned before, the cooling-chamber valve may be a commonly used valve, such as a puppet valve, slide valve, rotary valve, butterfly valve, switch valve, gate valve, or ball valve, or another less commonly known valve, depending on specific design requirements. Although the puppet valve is one of the most established types of valves, it may be subject to damage by the piston or rotor as the valve is required to move into the cylinder or working space. As a result, another type of valve, such as a slide valve or rotary valve may be employed. It should be pointed that although the intake and discharge values as shown in FIGS. 1-17 are puppet valves, they may also be replaced by other types of valves.

It is also well known that heat transfer rate would be significantly affected by the motion of the working fluid relative to a heat transfer surface. The motion of the working fluid in the cooling chamber may be generated during the compression stroke when the intake fluid is compressed into the cooling chamber. Similar to the concept of auxiliary chamber or pre-chamber in an internal combustion engine, the motion of the working fluid may be enhanced through shaping the passage between the cylinder space and the cooling chamber so that near the end of the compression, a vigorous working fluid flow is set up in the cooling chamber or the working fluid would rotate rapidly within the cooling chamber.

On the other hand if the motion of the working fluid generated by the motion of the piston is not strong enough or the vigorous flow in the cooling chamber may not be able to maintain during the time period when the working fluid is enclosed within the cooling chamber, an external means such as a turning wheel may be disposed within the cooling chamber to create sufficiently strong motion of the working fluid in the chamber (not shown). The wheel may be driven by a mechanism external of the cooling chamber. Alternatively, the wheel may be driven by the incoming working fluid to the cooling chamber during the compression stroke with the option of including a flywheel external or internal of the cooling chamber.

In the above embodiments, the heat removal from the working fluid of the refrigerator by a heat sink is realized through a cooling fluid. However, in some other applications, the heat may be directly transferred from the working fluid to a heat sink without a circulating cooling fluid inside the cooling chamber, or the heat may be transferred from the working fluid to a heat sink through an intermediate thermal conductor. Said thermal conductor may be a heat pipe or capillary pumped loop that may have an effective thermal conductance hundreds of times higher than that of copper. In this case, the evaporator section of the heat pipe or capillary pumped loop may be disposed in the cooling chamber of a refrigerator to receive heat from the working fluid, and the condenser section of the heat pipe or capillary pumped loop may transfer the heat received in the evaporator to the coolant of a radiator or work as a radiator that dissipates heat to the surrounding air. A preferred type of heat pipe for the current application may be a separate-type heat pipe. The use of the heat pipe or capillary pumped loop would have the benefits of reducing the size of the heat exchanger and providing flexibility of deploying the radiator of the cooling system, which may be particularly important to automotive related applications.

It will thus be seen that the invention effectively attains the objectives set forth above. It is intended that all matter contained in the above specification or shown in the accompanying drawings be interpreted as illustrative and not in a limiting sense. The cycles described in this disclosure are just a few options in accordance with the refrigerator platform of this invention. Many other cycles not mentioned in this disclosure may be possible based on the present refrigerator platform and would be within the spirit of the present invention. The descriptions regarding the positions or conditions of various system components, such as valves, piston, cylinder, or cooling chambers, are representative in nature for illustrating operating principles of a refrigerator according to the present invention. For example, when it is stated that a cooling chamber is closed or open in a stroke, it does not exclude the occurrence of an early opening or an early closing of the cooling chamber in the stroke. Any variation of the subject invention will be apparent to those skilled in the art after considering this specification together with the accompanying drawings.

What is claimed is:

1. A refrigerator comprising: at least a piston and cylinder assembly including a piston reciprocatingly mounted within a cylinder space, at least an intake port and a discharge port, and at least two cooling chambers being integrally formed in a cylinder head, each said cooling chamber having a heat exchanger unit disposed therewithin, a port leading to said cylinder space and at least a cooling-chamber valve, said valve opening or closing said port to establish or block the flow of a gaseous working fluid between each said cooling chamber and cylinder space, wherein each said cooling chamber is adapted to operate on an associated cycle comprising a compression stroke wherein an amount of working fluid is compressed into each said cooling chamber, an expansion stroke wherein working fluid in each said cooling chamber expands into the cylinder space to return an amount of work to the piston and produce an amount of cooled working fluid, and before the expansion stroke a time period for heat transfer from the working fluid enclosed within said cooling chamber to a heat sink to reduce a temperature of the enclosed working fluid; wherein during said time period when said working fluid is enclosed within each said cooling chamber, said piston provides strokes for the working fluid associated with another cooling chamber.

2. The refrigerator as described in claim 1, wherein said gaseous working fluid is air.

3. The refrigerator as described in claim 1, wherein the intake and discharge of the working fluid is realized through a scavenging process.

4. The refrigerator as described in claim 1, wherein said refrigerator has n cooling chambers being integrally formed in the cylinder head and is adapted to operate on a cycle having 4n strokes, where n is an integer that is equal to or greater than two, each said cooling chamber in a cycle having an associated intake stroke wherein an amount of intake working fluid is admitted into the cylinder, the compression stroke, the expansion stroke and a discharge stroke wherein an amount of expanded working fluid is discharged out of the refrigerator, and a time period of 4(n−1) strokes available for heat transfer from the working fluid enclosed within each said cooling chamber to the heat sink before the expansion stroke associated with the cooling chamber.

5. The refrigerator as described in claim 1, wherein said refrigerator has n cooling chambers being integrally formed in the cylinder head and is adapted to operate on a cycle having 2n strokes, where n is an integer equal to or greater than two, each cooling chamber in a cycle having an associated scavenging process wherein expanded working fluid is displaced by an intake working fluid, the compression stroke, the expansion stroke, and before said expansion stroke a time period of 2(n−1) piston strokes available for heat transfer from the working fluid enclosed within each said cooling chamber to the heat sink.

6. The refrigerator as described in claim 1, wherein a motion of the working fluid relative to a heat transfer surface of said heat exchanger unit is enhanced through shaping a passage between the cylinder space and each said cooling chamber so that near an end of the compression stroke, a vigorous flow of the working fluid is set up in each said cooling chamber or the working fluid rotates rapidly within each said cooling chamber.

7. The refrigerator as described in claim 1, wherein a motion of the working fluid relative to a heat transfer surface of said heat exchanger unit is enhanced through the disposition of a wheel within each said cooling chamber to generate working fluid motion in each said cooling chamber, said wheel being driven by a mechanism external of the cooling chamber, or being driven by an incoming working fluid to each said cooling chamber during the compression stroke.

8. The refrigerator as described in claim 1, wherein heat is transferred from the working fluid to the heat sink through a thermal conductor, said thermal conductor being a heat pipe or capillary pumped loop, wherein an evaporator of the heat pipe or capillary pumped loop is disposed inside the cooling chamber to receive heat from the working fluid, and a condenser of the heat pipe or capillary pumped loop transfers received heat to a coolant of a radiator or works as a radiator that dissipates the heat to the surroundings.

9. The refrigerator as described in claim 8, wherein said heat pipe is a separate-type heat pipe.

10. The refrigerator as described in claim 3, wherein said discharge port is integrated with each said cooling chamber so that expanded working fluid in each said cooling chamber may be substantially pushed out of the cooling chamber through said discharge port by an intake working fluid.

11. The refrigerator as described in claim 3, wherein the scavenging process is realized through the intake ports in the cylinder head.

12. A refrigerator comprising:
at least a piston and cylinder assembly including a piston reciprocatingly mounted within a cylinder space, at least an intake port and discharge port, and two cooling chambers being integrally formed in a cylinder head, each said cooling chamber having a heat exchanger unit disposed therewithin to remove heat from a gaseous working fluid of the refrigerator, wherein said refrigerator is adapted to operate on a four-stroke cycle having an intake stroke, a compression stroke, an expansion stroke, and a discharge stroke when the intake and discharge strokes are employed respectively for the intake and discharge of the working fluid, or on a two-stroke cycle including the compression stroke and the expansion stroke when a scavenging process is employed for the intake and discharge of the working fluid.

\* \* \* \* \*